United States Patent
Kwak et al.

(10) Patent No.: US 10,911,166 B2
(45) Date of Patent: Feb. 2, 2021

(54) METHOD AND APPARATUS FOR MEASURING CHANNEL IN WIRELESS COMMUNICATION SYSTEM

(71) Applicant: Samsung Electronics Co., Ltd., Suwon-si (KR)

(72) Inventors: Youngwoo Kwak, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/461,163

(22) PCT Filed: Dec. 18, 2017

(86) PCT No.: PCT/KR2017/014936
§ 371 (c)(1),
(2) Date: May 15, 2019

(87) PCT Pub. No.: WO2018/111053
PCT Pub. Date: Jun. 21, 2018

(65) Prior Publication Data
US 2019/0280784 A1 Sep. 12, 2019

(30) Foreign Application Priority Data
Dec. 16, 2016 (KR) .................. 10-2016-0172766

(51) Int. Cl.
*H04L 12/26* (2006.01)
*H04B 17/24* (2015.01)
(Continued)

(52) U.S. Cl.
CPC ............. *H04B 17/24* (2015.01); *H04N 7/088* (2013.01); *H04W 72/046* (2013.01); *H04L 5/0048* (2013.01)

(58) Field of Classification Search
CPC ..... H04W 24/08; H04W 24/10; H04W 88/08; H04W 84/12; H04W 72/046; H04W 24/02; H04L 5/0048; H04B 17/24; H04N 7/088
See application file for complete search history.

(56) References Cited

U.S. PATENT DOCUMENTS

| 9,369,882 | B2 * | 6/2016 | Kim | ............. H04W 76/27 |
| 2012/0082052 | A1 * | 4/2012 | Oteri | ............. H04W 24/10 370/252 |

(Continued)

FOREIGN PATENT DOCUMENTS

| KR | 10-2015-0070925 A | 6/2015 |
| WO | 2015/093892 A1 | 6/2015 |

(Continued)

OTHER PUBLICATIONS

3GPP TSG RAN WG1 #86-bis R1-1609080 Lisbon, Portugal Oct. 10-14, 2016 hereinafter 3GPP and Park (Year: 2016).*

(Continued)

*Primary Examiner* — Atique Ahmed
(74) *Attorney, Agent, or Firm* — Jefferson IP Law, LLP

(57) ABSTRACT

This disclosure relates to a communication technique that fuses a 5G communication system for supporting a higher data transfer rate than 4G systems, with IoT technology, and a system therefor. This disclosure can be applied to intelligent services (for example, smart home, smart building, smart city, smart car, or connected car, health care, digital education, retail, security, and safety-related services or the like) on the basis of 5G communication technology and IoT related technology. A method for a terminal according to the present invention comprises the steps of: receiving setting information for a reference signal; confirming whether beam switching is possible in a resource area to which the refer- (Continued)

ence signal is to be transmitted; and measuring the reference signal based on the confirmation result.

11 Claims, 13 Drawing Sheets

(51) Int. Cl.
  *H04W 72/04* (2009.01)
  *H04N 7/088* (2006.01)
  *H04L 5/00* (2006.01)

(56) References Cited

U.S. PATENT DOCUMENTS

| | | | |
|---|---|---|---|
| 2012/0108239 A1* | 5/2012 | Damnjanovic | H04W 36/0085 455/436 |
| 2013/0279356 A1* | 10/2013 | Park | H04B 7/0695 370/252 |
| 2016/0044517 A1* | 2/2016 | Raghavan | H04B 7/0695 370/329 |
| 2016/0308647 A1 | 10/2016 | Kwak et al. | |
| 2016/0337916 A1 | 11/2016 | Deenoo et al. | |
| 2016/0360463 A1 | 12/2016 | Kim et al. | |
| 2017/0214444 A1 | 7/2017 | Nigam et al. | |
| 2017/0331577 A1* | 11/2017 | Parkvall | H04J 11/0079 |
| 2018/0034523 A1* | 2/2018 | Kim | H04B 7/0639 |
| 2018/0102817 A1 | 4/2018 | Park et al. | |

FOREIGN PATENT DOCUMENTS

| | | |
|---|---|---|
| WO | 2016/018121 A1 | 2/2016 |
| WO | 2016/163843 A1 | 10/2016 |

OTHER PUBLICATIONS

Samsung: "Overview on beam management", 3GPP Draft: R1-1609080. 3rd Generation Partnership Roject (3GPP), Mobile Competence Centre ; 650, Route Des Lucioles ; F-06921 Sophia-Antipolis Ceoex ; France, vol. RAN WG1 , No. Lisbon, Portugal; Oct. 10-14, 2016 Oct. 9, 2016 (Oct. 9, 2016), XP051149131, Retrieved from the Internet: URL:http://www.3gpp.orglftp/Meetings_3GPP SYNC/RAN1/00cs/.

Extended European Search Report dated Sep. 20, 2019, issued in European Application No. 17880055.3.

Verizon, 'Verizon 5G TF; Air Interface Working Group; Verizon 5th Generation Radio Access; Physical layer Procedures (Release 1)', Oct. 2016.

Samsung, 'Discussion on Network triggered beam reporting', R1-1612512, 3GPP TSG RAN WG1 Meeting #87, Reno, USA, Nov. 4, 2016.

* cited by examiner

METHOD AND APPARATUS FOR MEASURING CHANNEL IN WIRELESS COMMUNICATION SYSTEM

TECHNICAL FIELD

The disclosure relates to a wireless communication system and, in particular, to a beam-based channel measurement method and apparatus for base stations and terminals supporting analog, digital, or hybrid beamforming.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

A reference signal is a signal that is used for measuring channel properties (such as channel strength and distortion, interference strength, and Gaussian noise) between a base station and users to facilitate demodulation and decoding of received data symbols. The reference signal is also used for the purpose of measuring a radio channel state. A receiver measures a signal strength of the reference signal that a transmitter transmits at a pre-agreed transmit power over a radio channel and determines the radio channel state therebetween based on the measurement result. The radio channel state is used to determine a data rate for which the receiver requests to the transmitter.

In a normal mobile communication system operating with constrained radio resources (such as time, frequency, and transmit power), the radio resource allocation for transmitting reference signals means reduction of the radio resources for transmitting data signals. For this reason, the radio resources allocation determination for transmitting the reference signals should be carefully made in consideration of the system throughput. How to allocate resources for the reference signals and measure the reference signals is one of very important technical issues, particularly in a system adopting a multiple-input multiple-output (MIMO) scheme exploiting multiple antennas.

5G New Radio (NR) employs a MIMO scheme supporting a large number of antennas (e.g., 1024) in a high frequency band (e.g., 30 GHz). For such a millimeter wave-based radio communication, it is necessary to employ a hybrid beamforming technique that combines radio frequency (RF) antenna-based analog beamforming and digital precoding-based digital beamforming to overcome problems arising in the corresponding frequency band characterized by strong straightness and high pathloss. However, it may occur that a base station or a terminal cannot perform beam switching in a resource region where the reference signal is transmitted; in this case, the terminal cannot measure the reference signal transmitted in the corresponding resource region. There is therefore a need of a method for measuring the reference signal according to the beam switching capability of the base station or the terminal.

DISCLOSURE OF INVENTION

Technical Problem

The disclosure has been made in an effort to solve the above problems and aims to provide a method for measuring a channel or beam quality according to a beam switching capability of a base station and a terminal that support an analog, digital, or hybrid beam forming scheme and reporting and exploiting the corresponding information.

Solution to Problem

According to an embodiment of the disclosure, a method of a terminal includes receiving configuration information on a reference signal, determining whether beam switching is possible in resource regions for transmitting the reference signal, and measuring the reference signal based on a result of the determination.

According to an embodiment of the disclosure, a method of a base station includes receiving beam switching capability information of a terminal, determining whether the terminal is capable of performing beam switching inresource regions for transmitting a reference signal based on the beam switching capability information, and transmitting configuration information on the reference signal based on a result of the determination.

According to an embodiment of the present invention, a terminal includes a communication circuitry configured to transmit and receive signals and a controller configured to control to receive configuration information on a reference signal, determine whether beam switching is possible in resource regions for transmitting the reference signal, and measuring the reference signal based on a result of the determination.

According to an embodiment of the present invention, a base station includes a communication circuitry configured to transmit and receive signals and a controller configured to control to receive beam switching capability information of a terminal, determine whether the terminal is capable of performing beam switching in resource regions for transmitting a reference signal based on the beam switching capability information, and transmit configuration information on the reference signal based on a result of the determination.

Advantageous Effects of Invention

According to the disclosure, the method for measuring a channel or beam quality according to a beam switching capability of a base station and a terminal that support an analog, digital, or hybrid beam forming scheme and reporting and exploiting the corresponding information is advantageous in terms of making it possible to measure the channel state.

MODE FOR THE INVENTION

Figure 1:
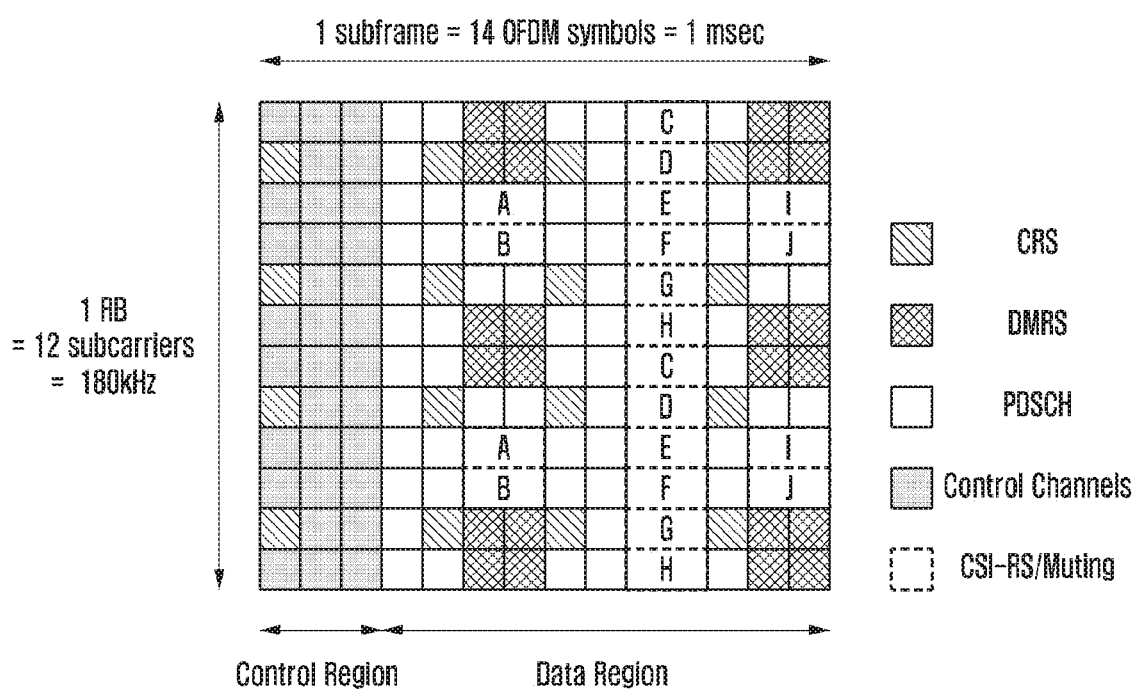
FIG. 1 is a diagram illustrating radio resources for downlink scheduling in an LTE/LTE-A system.

The disclosure relates to a normal wireless mobile communication system and, in particular, to a method for mapping a reference signal (RS) in the wireless mobile communication system employing a multi-carrier-based multiple access scheme such as an orthogonal frequency division multiple access (OFDMA).

The mobile communication system has evolved to a high-speed, high-quality wireless packet data communication system capable of providing data and multimedia services beyond the early voice-oriented services. The standardization organizations such as the $3^{rd}$ Generation Partnership Project (3GPP), the $3^{rd}$ Generation Partnership Project-2 (3GPP2), and the Institute of Electrical and Electronics Engineers (IEEE) have standardized $3^{rd}$ Generation mobile communication systems based on multicarrier multiple-access schemes. Recently, various multicarrier-based mobile communication standards such as 3GPP Long Term Evolution (LTE), 3GPP2 Ultra Mobile Broadband, and IEEE 802.16m have been developed to meet the requirements of the high-speed, high-quality wireless packet data communication services.

The existing 3G wireless packet data communication systems (such as LTE, UMB, and 802.16m) operate based on multicarrier multiple access schemes and adopt various techniques such as MIMO, beamforming, Adaptive Modulation and Coding (AMC), and Channel-Sensitive Scheduling to improve the transmission efficiency. The above techniques are capable of improving transmission efficiency and system throughput in such a way of adjusting a data rate by concentrating transmission power to certain antennas according to the channel quality and transmitting data selectively to the user with a high channel quality. Because most of these techniques operate based on the channel state information between a base station (BS) (hereinafter, interchangeably referred to as evolved Node B (eNB) and a terminal (hereinafter, interchangeably referred to as User Equipment (UE) and Mobile Station (MS)), the base station or the terminal needs to measure the channel state therebetween using a reference signal such as Channel State Indication Reference Signal (CSI-RS). The eNB denotes a device located at a certain place for downlink transmission and uplink reception, and one eNB may transmit and receive signals via a plurality of cells. A mobile communication system is comprised of a plurality of geometrically distributed eNBs, and each eNB may host a plurality of cells for transmitting and receiving signals.

The existing $3^{rd}$ and $4^{th}$ generation mobile communication systems such as LTE/LTE-A may employ a MIMO technique exploiting a plurality of transmit and receive antennas for improving a data rate and system throughput.

The MIMO technique exploits multiple transmit/receive antennas to transmit spatially-separated multiple information streams. This technique of transmitting multiple spatially-separated information streams is referred to as spatial multiplexing. Typically, the number of information streams that can be spatially multiplexed may be determined depending on the numbers of antennas of the transmitter and receiver. The number of information streams that can be spatially multiplexed may be referred to as the rank of the corresponding transmission.

The MIMO technique adopted in LTE/LTE-A Release 11 supports the spatial multiplexing with up to 8 transmit antennas and 8 receive antennas, i.e., up to rank 8.

In order to achieve the design goal of the 5G NR mobile communication system for supporting various types of services such as eMBB, mMTC, and URLLC, minimizing always-on transmission of reference signals and transmitting the reference signals aperiodically are being considered for flexible allocation of the time and frequency resources.

Exemplary embodiments of the disclosure are described in detail with reference to the accompanying drawings.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed description of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions).

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

Although the descriptions are directed to NR and LTE/LTE-A systems, the disclosure can be applied, without modification, to other communication systems operating in licensed and unlicensed bands.

Although depicted in a particular order in the drawings, two successive steps may be performed in reverse order or in parallel.

FIG. 1 is a diagram illustrating radio resources for downlink scheduling in an LTE/LTE-A system.

As shown in FIG. 1, the radio resources are allocated by unit of a subframe in the time domain and by unit of a resource block (RB) in the frequency domain. The radio resources consist of 12 subcarriers in the frequency domain and 14 OFDM symbols in the time domain, which results in a total of 168 frequency-time locations. In LTE/LTE-A, each of the frequency-time locations as shown in FIG. 1 is referred to as resource element (RE).

The radio resources may be configured as shown in FIG. 1 to transmit different types of signals as follows:

1. Cell-specific Reference Signal (CRS): This is a reference signal broadcast periodically for use in common by all UEs within one cell.

2. Demodulation Reference Signal (DMRS): This is a reference signal transmitted to a specific UE only when there is data to transmit to the corresponding UE. Up to 8 DMRS ports can be supported. In LTE/LTE-A, antenna ports 7 to 14 are DMRS ports, which maintain orthogonality therebetween using Code Division Multiplexing (CDM) or Frequency Division Multiplexing (FDM) to avoid interference to each other.

3. Physical Downlink Shared Channel (PDSCH): This is a downlink channel for use in transmitting traffic (or data) from an eNB to a UE. The eNB may transmit data using REs to which no reference signal is mapped in the data region (or PDSCH region) in FIG. 1.

4. CSI-RS: This is a reference signal transmitted for use by UEs within a cell in channel status measurement. There may be multiple CSI-RSs transmitted within a cell.

5. Other control channels (Physical Hybrid-ARQ Indicator Channel (PHICH), Physical Control Format Indicator Channel (PCFICH), and Physical Downlink Control Channel (PDCCH)): An eNB may provide a UE with control information for use by the UE in receiving data on PDSCH or transmitting HARQ ACK/NACK corresponding to uplink data transmission.

In addition to the aforementioned signals, the eNB may configure muting in the LTE-A system such that the UEs located within the corresponding cell are capable of receiving the CSI-RS transmitted by neighboring eNBs with no interference. The muting may be configured at the positions designated for CSI-RS and, typically, the UE may skip attempting to receive traffic signals at the muted CSI-RS positions. In the LTE-A system, muting is referred to as zero power CSI-RS. This is because muting is by nature applied to the CSI-RS positions without transmission power.

In FIG. 1, the CSI-RS may be transmitted at some of the positions marked by A, B, C, D, E, F, G, H, I, and J designated according to the number of CSI-RS antenna ports. The zero power CSI-RS (muting) may also be mapped to some of the positions A, B, C, D, E, F, G, H, I, and J.

The CSI-RS may be mapped to 2, 4, or 8 REs according to the number of CSI-RS antenna ports. For two antenna ports, half of a specific pattern of FIG. 1 is used for CSI-RS transmission; for four antenna ports, a whole specific pattern is used for CSI-RS transmission; and for eight antenna ports, two patterns are used for CSI-RS transmission.

Meanwhile, the zero power CSI-RS (muting) is always transmitted by unit of one pattern. That is, although muting is applicable to multiple patterns, if the muting positions are not overlapped with the CSI-RS positions, muting cannot be applied to part of one pattern. However, if the CSI-RS positions are overlapped with the zero power CSI-RS (muting) positions, muting may be applied to part of one pattern.

In the case of transmitting CSI-RSs for 2 antenna ports, the CSI-RSs for the two antenna ports are mapped to two REs consecutive in the time domain and they are distinguished from each other by orthogonal codes. In the case of transmitting CSI-RSs for 4 antenna ports, the CSI-RSs for two of the four antenna ports are mapped two consecutive REs while the CSI-RSs for the remaining two antennas ports are mapped to two other consecutive REs. Even in the case of transmitting CSI-RSs for 8 antenna ports, CSI-RS mapping is performed by the same method. In the cases of transmitting CSI-RSs for 12 and 16 antenna ports, the corresponding CSI-RS patterns are generated by aggregating 3 4-antenna port CSI-RS patterns or by aggregating 2 CSI-RS 8-antenna port CSI-RS patterns, respectively.

In addition, the UE may be allocated CSI interference measurement resources (CSI-IM or CSI-IMR) along with CSI-RS, the CSI-IM resources having the same structure and positions as the CSI-RS resources supporting four ports. The CSI-IM is resources for enabling a UE receiving data from one or more eNBs to accurately measure the interference caused by neighboring eNBs. For example, in order to accurately and effectively measure an interference amount when a neighboring BS transmits data and an interference amount when the neighboring eNB transmits no data, the serving eNB may configure the CSI-RS resources and two CSI-IM resources, one CSI-IM resource permitting signal transmission of the neighboring eNB at all times and the other prohibiting signal transmission of the neighboring eNB at all times. Table 1 shows RRC fields constituting a CSI-RS configuration.

TABLE 1

| RRC configuration for supporting periodic CSI-RS in CSI process | | | |
|---|---|---|---|
| CSI-RS config | CSI-IM config | CQI report config | Etc |
| No. antenna ports | Resource config | Periodic | $P_c$ |
| Resource config | Time and frequency | Mode, resource, | Codebook subset |
| Time and frequency | position in a subframe | periodicity, offset . . . | restriction |
| position in a subframe | Subframe config | Aperiodic | |
| Subframe config | Periodicity and subframe | Mode . . . | |
| Periodicity and subframe | offset | PMI/RI report | |
| offset | | RI reference CSI | |
| Qcl-CRS-Info (QCL | | process | |
| Type B) | | SubframePattern | |
| CRS information for CoMP | | | |

[1]

Configurations for periodic CSI-RS-based channel state report in a CSI process may be categorized into 4 categories as shown in Table 1.

The CSI-RS configuration information (CSI-RS config) is provided to configure frequency-time locations of the CSI-RS REs. Here, the number of ports of the CSI-RS is set through the number of antennas configuration.

The resource configuration information (Resource config) indicates the time-frequency locations of REs in an RB, and the subframe configuration information (subframe config) indicates a subframe periodicity and subframe offset. Table 2 shows settings in the Resource config and Subframe config supported in legacy LTE.

TABLE 2

| Resource config and Subframe config settings | | | | | | | |
|---|---|---|---|---|---|---|---|
| (a) Resource config setting | | | | | | | |
| | | Number of CSI reference signals configured | | | | | |
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |

TABLE 2-continued

Resource config and Subframe config settings

|  | | | | | | | |
|---|---|---|---|---|---|---|---|
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

(b) Subframe config setting

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The UE may ascertain the frequency-time locations, periodicity, and offset of the resources for use in transmitting CSI-RS from Table 2.

Qcl-CRS-info denotes the quasi collocation information for CoMP.

The CSI-IM configuration information (CSI-IM config) is provided to configure the frequency-time locations of the CSI-IM resources for interference measurement. Because the CSI-IM resources are always configured based on 4 ports, there is no need to indicate a number of antenna ports; the CSI-IM resources are configured with the resource configuration information (Resource config) and subframe configuration information (Subframe config) in the same manner as the CSI-RS resources.

The CQI report configuration information (CQI report config) is provided to configure how to report the channel condition in the corresponding CSI-RS process. This configuration information may include a periodic channel state report configuration, aperiodic channel state report configuration, a PMI/RI report configuration, an RI reference CSI process configuration, and a subframe pattern configuration. This configuration information may further include "PC" indicating the power ratio between PDSCH REs and CSI-RS REs and codebook subset restriction information for indicating codebooks to be used.

As described above, an FD-MIMO eNB has to configure resource signal resources for use in measurement on eight or more antenna channels and transmit corresponding information to a UE and, in this case, the number of reference signals may vary according to the eNB antenna configuration and measurement scheme (measurement type). For example, it may be possible to configure {1, 2, 4, 8, 12, 16}-port CSI-RSs under the assumption of full port mapping in LTE/LTE-A release 13.

Here, the full port mapping means that every TXRU has a dedicated CSI-RS port for channel estimation.

Meanwhile, it is likely that 16 or more TXRUs will be supported in LTE/LTE-A release 14 or beyond. It is also expected that the number of supportable antenna array configurations increases dramatically in comparison with release 13. This means that it is necessary to support a scalable number of TXRUs in LTE/LTE-A release 14. Table 3 lists 2-dimensional (2D) antenna array geometries according to the number of CSI-RS ports available in the full port mapping situation.

TABLE 3

Available 2D antenna array geometry according to the number of aggregated
CSI-RS ports based on full port mapping

| Number of aggregated CSI-RS ports | Number of aggregated CSI-RS ports per polarization | Available 2D antenna array geometry, (N₁, N₂) (1D configurations were omitted) | | | | Impact on 2D RS and feedback design |
|---|---|---|---|---|---|---|
| 18 | 9  | (3, 3) | —      | —      | —      | Low  |
| 20 | 10 | (2, 5) | (5, 2) | —      | —      | Med  |
| 22 | 11 | —      | —      | —      | —      | —    |
| 24 | 12 | (2, 6) | (3, 4) | (4, 3) | (6, 2) | High |
| 26 | 13 | —      | —      | —      | —      | —    |
| 28 | 14 | (2, 7) | (7, 2) | —      | —      | Med  |
| 30 | 15 | (3, 5) | (5, 3) | —      | —      | Med  |
| 32 | 16 | (2, 8) | (4, 4) | (8, 2) | —      | High |

Table 1 lists the numbers of CSI-RS ports of {18, 20, 22, 24, 26, 28, 30, 32}, which may be divided into two halves each including {9, 10, 11, 12, 13, 14, 15, 16} that correspond to number of AP locations in consideration that the different polarizations antennas are collocated. Meanwhile, it may be possible to configure the antenna array in the form of a 2D rectangle or square with N1 AP locations in a first dimension (vertical or horizontal direction and N2 AP locations in a second dimension (horizontal or vertical direction) according to the combination of dimension-specific numbers of antenna ports as shown in Table 3. Table 3 shows that the antenna array can be configured in various forms according to the number of CSI-RS ports.

In a cellular system, reference signals are be transmitted for downlink channel state measurement. In the 3GPP LTE-A system, a UE measures the channel state based on CSI-RS transmitted by an eNB. The channel state is measured in consideration of a few factors including downlink interference amount. The downlink interference amount is very important for estimating the channel condition and is measured based on interference signals from the antennas of neighboring eNBs and thermal noise. Under the assumption that an eNB with one transmit antenna transmits resource signals to a UE with one receive antenna, the UE has to determine a ratio of energy per symbol to interference to be received simultaneously (Es/Io) based on the reference signal transmitted by the eNB. The UE converts the determined En/Io to a data rate or a corresponding value and transmits to the eNB the data rate or the corresponding value in the form of a channel quality indicator (CQI), on the basis of which the eNB determines the data rate for use in transmission to the UE.

A UE transmits downlink channel status information to an eNB for use by the eNB in downlink scheduling. That is, the UE measures the reference signals transmitted by the eNB and transmits feedback information generated based on the reference signals to the eNB. As aforementioned, the feedback information may be referred to as channel status information, which includes three types of information as follows:

Rank Indicator (RI): An indicator indicating a number of spatial layers that can be supported by a UE in the current channel condition.

Precoding Matrix Indicator (PMI): An indicator indicating a preferred precoding matrix for a UE in the current channel condition.

Channel Quality Indicator (CQI): An indicator indicating a maximum possible data rate for a UE to receive data in the current channel condition.

The CQI may be substituted by signal-to-interference-plus-noise ratio (SINR), maximum error correction code rate and modulation scheme, or data efficiency per frequency that can be used to indicate the maximum possible data rate.

The RI, PMI, and CQI are associated among each other in meaning. For example, the precoding matrices supported in LTE/LTE-A are defined in a rank-specific manner. Accordingly, PMI X may be interpreted differently depending on whether the RI is set to 1 or 2. The UE may also determine a CQI under the assumption that the eNB applies the PMI X that the UE has reported. That is, if the UE reports RI_X, PMI_Y, and CQI_Z, this means that the UE is capable of receiving signals at a data rate corresponding to CQI_Z for the case where RI_X and PMI_Y are in use. In this manner, the UE may determine the CQI of which a corresponding transmission mode makes it possible to achieve an optimal throughput for real transmission.

Figure 2:
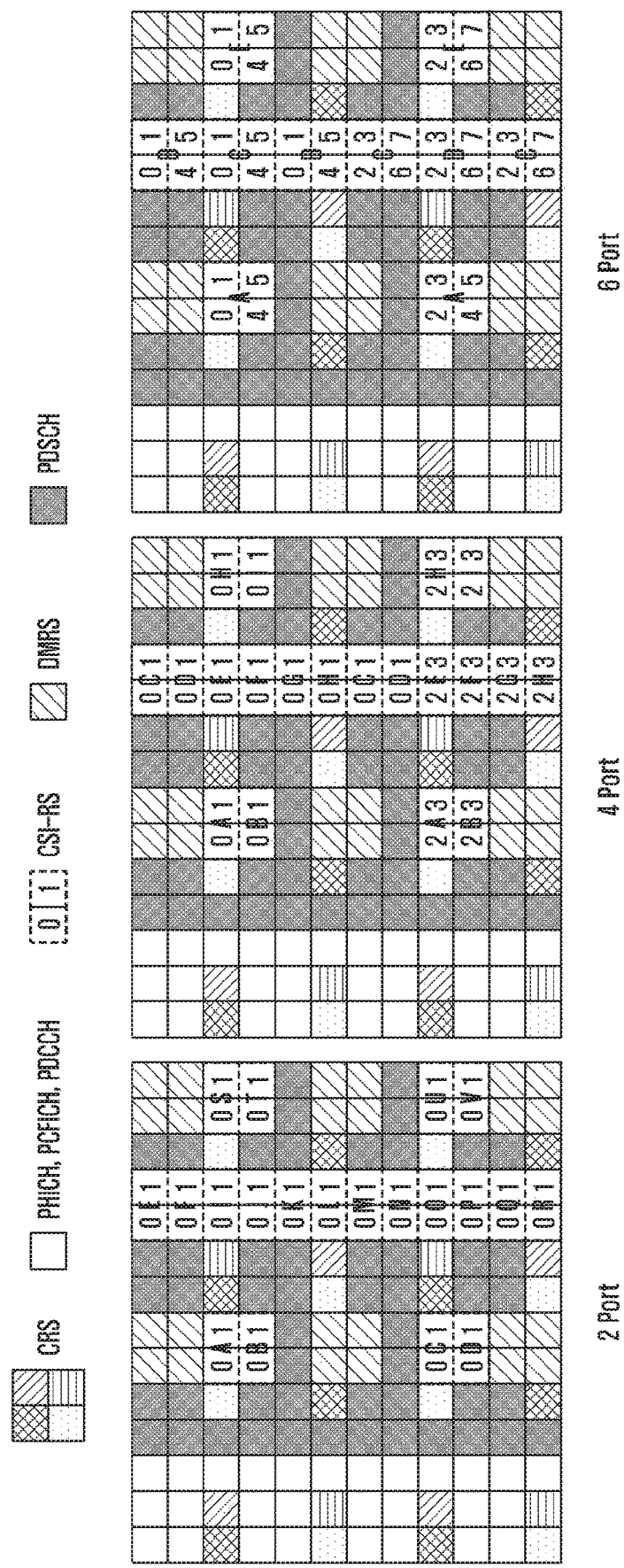
FIG. 2 is a diagram illustrating 2-antenna port, 4-antenna port, and 8-antenna port CSI-RS transmission patterns in an LTE system.

FIG. 2 is a diagram illustrating 2-antenna port, 4-antenna port, and 8-antenna port CSI-RS transmission patterns in an LTE system.

An eNB with a large number of antennas has to configure reference signal resources for measuring 8 or more antenna channels and transmits corresponding resource configuration information for use by a UE in generating and reporting channel information. As shown in FIG. 2, although up to 48 REs are available as CSI-RS resources, 8 REs can be configured for CSI-RS per CSI process at present. In order to implement an FD-MIMO system supporting 8 or more CSI-RS ports, there is a need of a new CSI-RS configuration method. For example, LTE/LTE-A release 13 supports 1, 2, 4, 8, 12, and 16 CSI-RS ports per CSI process. In detail, 1-port, 2-port, 4-port, and 8-port CSI-RSs may be patterned according to the legacy mapping rule, 12-port CSI-RSs by aggregating 3 4-port CSI-RS patterns, and 16-port CSI-RSs by aggregating 2 8-port CSI-RS patterns. In LTE/LTE-A release 13, the 12-port CSI-RSs and 16-port CSI-RSs may be configured through code division multiplexing 2 (CDM-2) with an orthogonal cover code (OCC) of length 2 and CDM-4 with an OCC of length 4.

Figure 3:
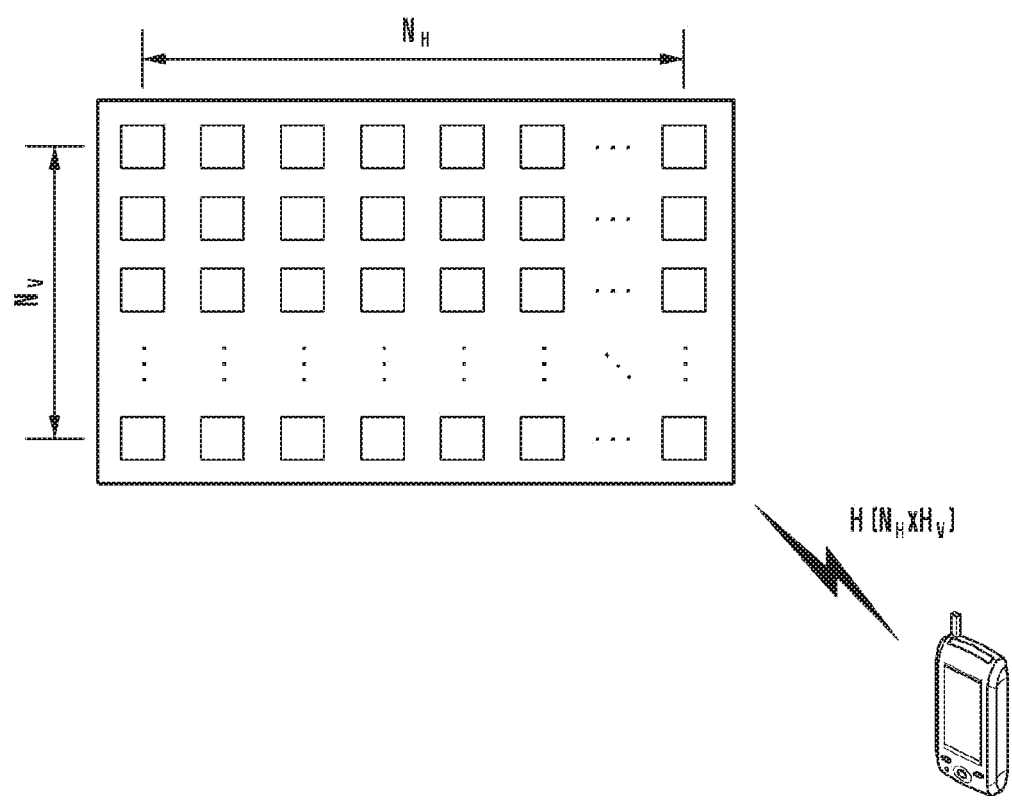
FIG. 3 is a diagram for explaining a communication system to which the disclosure is applied.

FIG. 3 is a diagram for explaining a communication system to which the disclosure is applied.

FIG. 3 is directed to CDM-2 CSI-RS transmission that requires power boosting of up to 9 dB to achieve full power utilization for 12-port/16-port CSI-RS configuration based on CDM-2, in comparison with PDSCH transmission. This means that the 12-port/16-port CSI-RS configuration based on CDM-2 requires more demanding hardware than that that is required by a legacy CSI-RS configuration to achieve full power utilization. For this reason, the LTE release 13 employs the 12-port/16-port CSI-RS configurations based on CDM-4, which makes it possible to achieve full power utilization with 6 dB power boosting as before. Furthermore, release 14 employs 32-port CSI-RS configurations based on CDM-8.

As described above, 5G NR employs a MIMO scheme supporting a large number of antennas (e.g., 1024) in a high frequency band (e.g., 30 GHz). For such a millimeter wave-based radio communication, it is necessary to employ a hybrid beamforming technique that combines radio frequency (RF) antenna-based analog beamforming and digital precoding-based digital beamforming to overcome problems arising in the corresponding frequency band characterized by a strong straightness and high pathloss.

Figure 4:
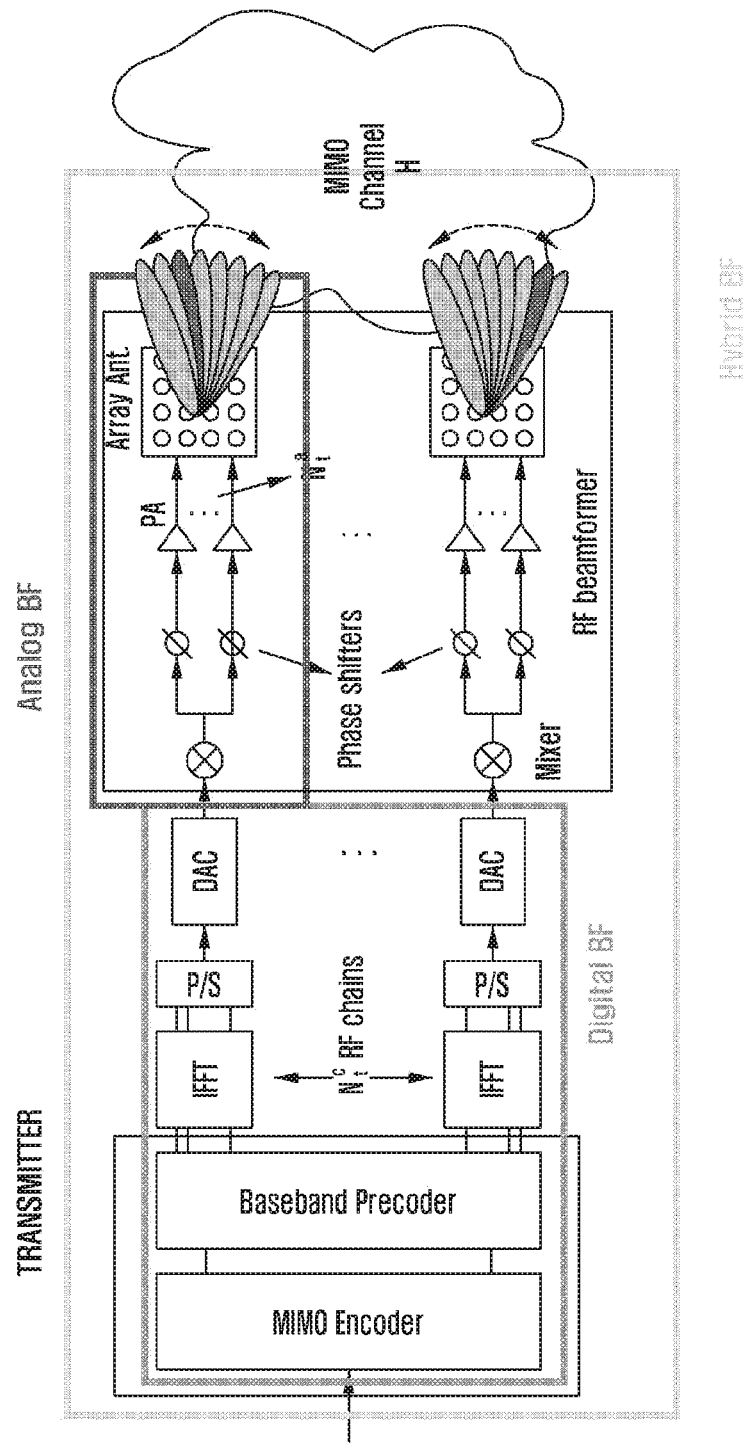
FIG. 4 is a diagram illustrating a hybrid beamforming system.

FIG. 4 is a diagram illustrating a hybrid beamforming system.

In reference to FIG. 4, a transmitter may mean a base station or a terminal. Each of the base station and the terminal includes an RF chain and a phase shifter for digital and analog beamforming. The transmitter performs the analog beamforming in such a way of shifting phases of signals to be transmitted through a plurality of antennas by means of the phase shifter to concentrate the signal in a predetermined direction. In order to accomplish this, an array antenna composed of a plurality of antenna elements is used. Such transmit beamforming is advantageous in terms of increasing signal propagation distance and reducing interference to other users dramatically because the signals are not emitted in other directions. A receiver may also perform receive beamforming with a receive array antenna, which concentrates reception of signals only in a predetermined direction and not in other directions to increase the signal reception sensitivity in that direction, resulting in canceling interferences.

Considering the nature of an electric wave of which wavelength decreases as frequency increases, if the antennas are arranged at an interval of half the wavelength, it may be possible to arrange more antenna elements within a given space. This means that it is advantageous to implement a beamforming technique in the communication system operating in a high frequency band rather than in a low frequency band in terms of antenna gain.

In order to achieve higher antenna gain, it is possible to employ a hybrid beamforming technique based on combining an analog beamforming technique and a digital precoding technique that is in use for data rate improvement in a legacy multi-antenna system. In this case, digital beamforming is performed in such a way of forming one or more analog beams and performing digital precoding on the analog beams in a similar way to that being performed in baseband in the legacy multi-antenna system, thereby making it possible to expect improvement in signal reception reliability and system throughput.

The disclosure proposes a method for a base station and a terminal that support an analog, digital, or hybrid beamform technique to measure and report a beam quality according to their beam switching capabilities and to use the corresponding information.

One of the most important considerations in use of a beamforming technique is to select the best beam direction for the corresponding base station and terminal. In order to select the best beam, the base station and terminal may be configured to support beam sweeping using multiple time and frequency resources.

Figure 5:
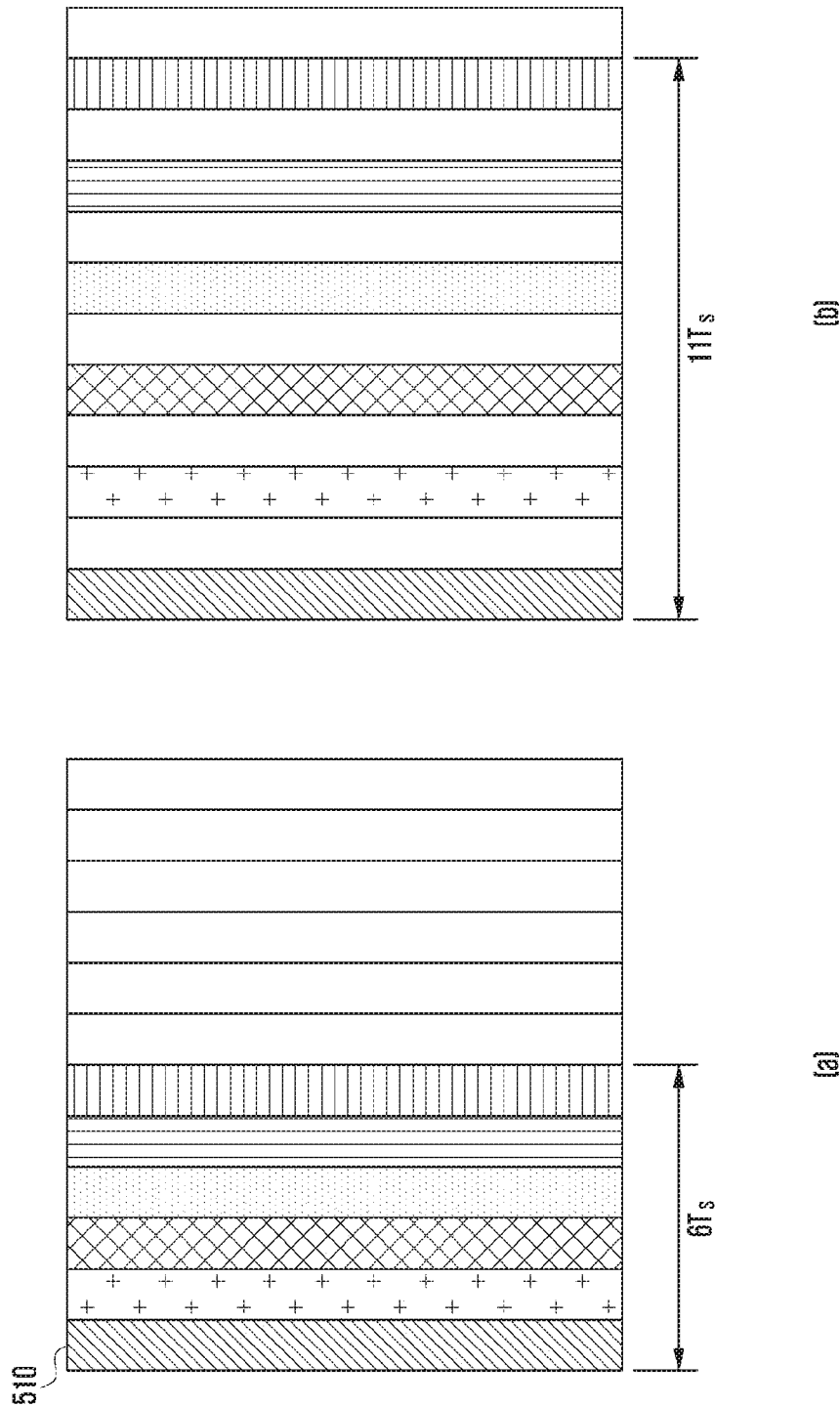
FIG. 5 is a diagram for explaining a sweeping operation of a terminal and a base station.

FIG. 5 is a diagram for explaining a sweeping operation of a terminal and a base station.

In reference to FIG. 5, the terminal or the base station may transmit reference signals over different beams on different time resources to select the best beam for the terminal or the base station. This technique for transmitting the reference signals over different beams on different time resources is referred to as beam sweeping. The base station or the terminal may receive the reference signals over the different beams, evaluate qualities of the reference signals based on CSI, reference signal received power (RSRP), or reference signal received quality (RSRQ) measured on the reference signals for beam selection, and select one or more transmit or receive beams according to the evaluation result.

The drawing shows that the resources are split on the time axis for transmitting the reference signals. A time duration for transmitting a reference signal as denoted by reference number 510 may be referred to as a "resource region". A detailed description of the resource region is made later. Although FIG. 5 shows that the reference signals are transmitted over different beams on different time resources, the reference signals may also be transmitted on different frequency or code resources. That is, the resource region may refer to a region obtained by dividing a resource by a frequency axis, and the same can be applied to a code resource.

Such resource allocation for beam sweeping should be designed in consideration of the time required for the beam sweeping. Part (a) of FIG. 5 depicts that 6 consecutive resource regions are allocated for a beam. Although the term "resource region" is used by way of example to explain splitting the resources on the time axis, a resource region may be equivalent to a symbol, and the terms "resource region" and "symbol" may be interchangeably used in the following description.

In part (a) of FIG. 5, 6 consecutive symbols are allocated for beam sweeping and, if a symbol has a length of 1 $T_s$, it takes 6 Ts to the beam sweeping.

In part (b) of FIG. 5, symbols are allocated in an alternating fashion for sweeping a beam. If the symbols are allocated in the alternating fashion for a beam as above, it takes 11 Ts to complete the beam sweeping, and the extended time overhead degrades efficiency.

In order to implement the analog, digital, or hybrid beamforming along with a beam sweeping technique, it is necessary to consider the characteristics of the corresponding beamforming and beam switching capabilities of both the terminal and base station. In the case of employing the analog beamforming, it is necessary to consider the characteristics of a hardware-based phase shifter. Employing the analog beamforming technique implemented with the hardware-based phase shifter makes it impossible to form another analog beam in the same frequency band. Accordingly, multiple time resources are required for beam sweeping. Furthermore, a structure of symbols may be considered support different beam measurements on differenct time resources.

Figure 6:
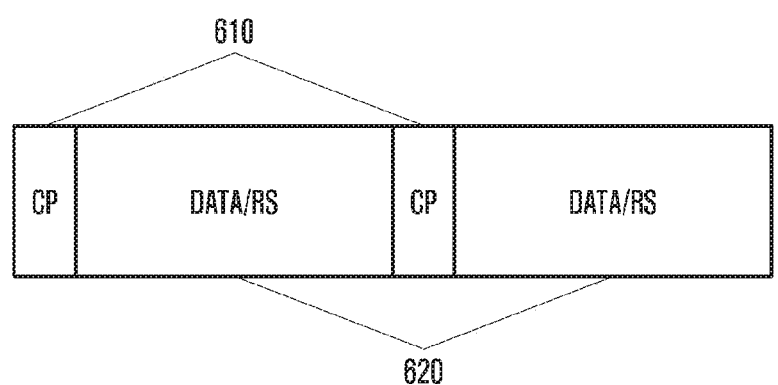
FIG. 6 is a diagram illustrating a structure of symbols.

FIG. 6 is a diagram illustrating a structure of symbols.

As shown in FIG. 6, a symbol includes a cyclic prefix (CP) portion 610 for overcoming inter-symbol interference and a data/reference signal portion 620. Because the data/reference signal portion 620 is allocated for transmitting a reference signal, the phase shifter of a base station or a terminal has to perform its phase shifting operation within the CP portion 610. However, the phase shifting operation varies from terminal to terminal because the phase shifting operation depends on the structure of the phase shifter and because of the coexistence of terminals having or not having the capability of beam switching across consecutive symbols.

In addition to the phase shifting capability of the terminal, it should also be necessary to consider the symbol structure varying according to numerologies being supported by the base station and terminal. Table 4 shows subcarrier spacing-specific CP lengths.

TABLE 4

CP length of OFDM symbol according to Subcarrier spacing

| Subcarrier spacing (kHz) | CP length (us) | Subcarrier spacing (kHz) | CP length (ns) |
|---|---|---|---|
| 15 | 4.7 | 120 | 585 |
| 30 | 2.35 | 240 | 293 |
| 60 | 1.17 | 480 | 146 |

[2]

As shown in Table 1, the symbol length decreases in reverse proportion to the subcarrier spacing, resulting in a decrease of the CP length. This means a decrease of the time period during which the terminal and the base station have to perform phase shifting on their RF circuits for beam switching.

Assuming that the beam switching operation should be completed within 400 ns, the terminal can complete beam switching within the CP length and even across consecutive symbols for the cases of using the subcarrier spacings of 15, 30, 60, and 120 kHz because the CP length for each of these cases is greater than 400 ns. Meanwhile, the terminal cannot complete beam switching within the CP length and even across consecutive symbols for the cases of using the subcarrier spacing 240 and 480 KHz because the CP length of each of these cases is less than 400 ns.

The disclosure makes it possible for a terminal and a base station to perform beam sweeping according to the beam switching capability of the terminal and the base station by allowing selection of a beam according to the beam switching capability of the terminal or the base station for resource allocation or measurement. Although the description is directed to the case of using time resources (OFDM symbols), the disclosure can be applied to the cases of using frequency resources and code division resources. Although the description is directed to the case of considering the beam switching capability in association with the time period required for phase shifting of the terminal, it is also possible to consider various beam switching capabilities such as a precoding capability, a beam switching capability for hybrid beamforming, and a beam switching capability considering multiple panels. Although the following description is made with the beam switching capability over consecutive resources, it is not mandatory for the resources to be consecutive, and the disclosure may include all cases where the distance between the time division resources, frequency division resources, or code division resources is too far to be covered by the switching capability of the terminal.

First Embodiment

Figure 7:
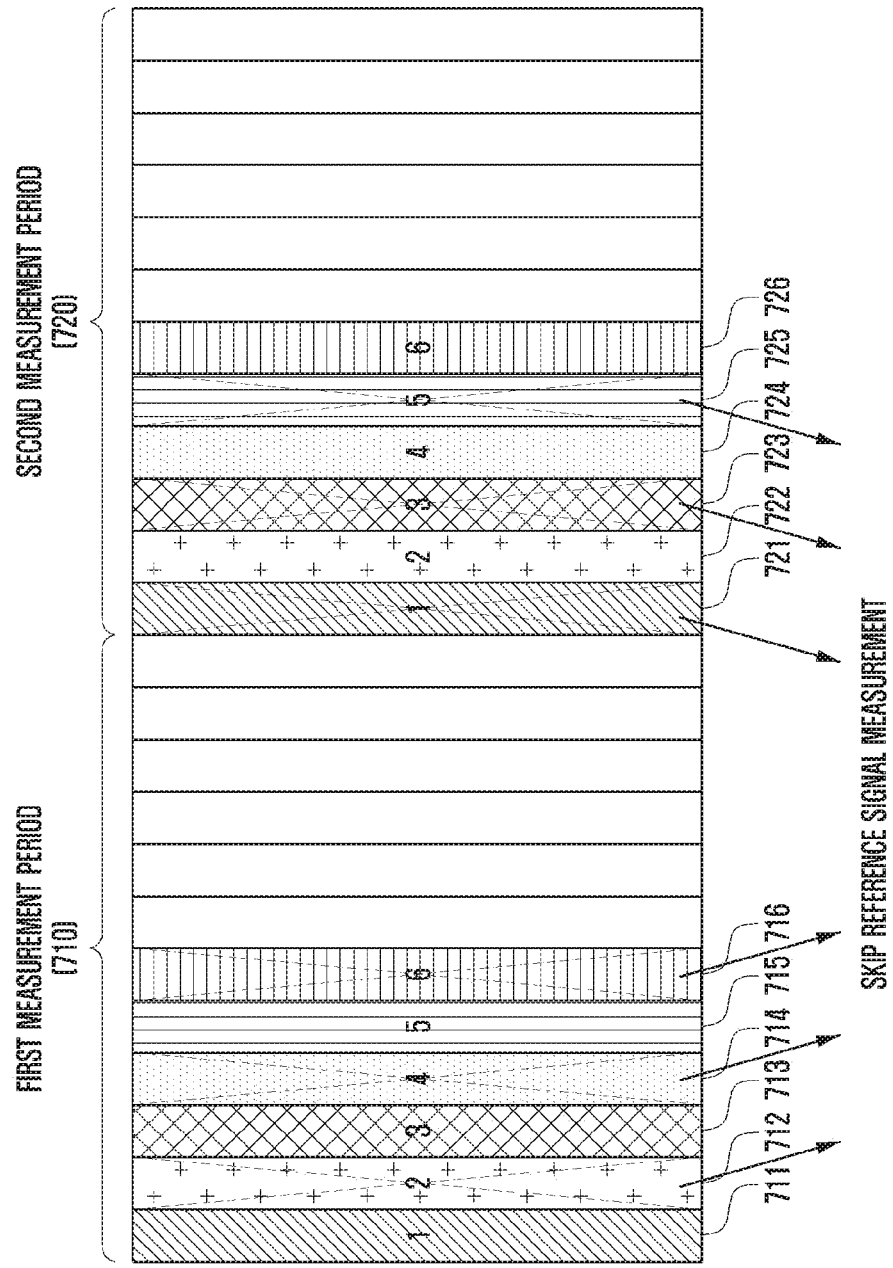
FIG. 7 is a diagram for explaining an operation of a receiver according to the first embodiment of the disclosure.

FIG. 7 is a diagram for explaining an operation of a receiver according to the first embodiment of the disclosure.

The receiver of the disclosure may be a terminal or a base station. Although the description is directed to the case where the receiver is a terminal by way of example, the disclosure may be identically applied to a base station.

The first embodiment may be applicable in a situation where a transmitter has no information on whether the receiver has the beam switching capability or a situation where terminals supporting beam switching and terminals not supporting beam switching are allocated the same resources. In the first embodiment, the receiver may perform measurement on a reference signal in some of the resource regions of a measurement period in which the receiver can perform measurement and perform measurement on the reference signal in the remaining resource regions within the next measurement period or resources.

In the disclosure, the terminal or the base station may perform beam sweeping by the unit of a resource region to transmit reference signals. As shown in FIG. 7, the reference signal may be transmitted in different resource regions over different beams. Here, a resource region may be defined as a duration for transmitting the reference signal over a beam. In the drawing, reference numbers 711 to 716 denote individual resource regions in which the reference signals are transmitted over different beams.

In the disclosure, the resources allocated for transmitting all reference signals may be referred to as a measurement period. All reference signals may mean all of the reference signals being transmitted over different beams. One measurement period may include multiple resource regions allocated for transmitting different beams. Some of the resource regions constituting a measurement period may not be used for transmitting reference signals. That is, a measurement period may include reference signal resource regions and non-reference signal resource regions. In the disclosure, the reference signal resource regions in the measurement period are referred to as a reference signal resource pool.

The measurement period may have an offset and a periodicity, and information on the offset and periodicity may be included in configuration information being transmitted by the terminal or the base station. A detailed description thereof is made later.

It is assumed that the terminal is allocated resources for receiving reference signals through beam sweeping as shown in part (a) of FIG. 5. However, the terminal may not support beam switching in the allocated resource regions. The beam switching capability information of the terminal may be stored in the terminal.

If none of the terminals support beam switching between resource regions, the base station may allocate resources for use by the terminals in receiving reference signals as shown in part (b) of FIG. 5.

However, if the base station has no information on the beam switching capabilities of the terminals, a problem may arise in the situation where a certain terminal supports beam switching between resource regions. If a terminal supports beam switching between resource regions, it is possible to allocate consecutive resource regions as shown in part (a) of FIG. 5, which makes it possible to efficiently utilize resources such as the time required for beam sweeping. In the case of allocating the consecutive resource regions as shown in part (a) of FIG. 5, some of the terminals may not perform reference signal measurement. There is therefore a need of a method for performing reference signal measurement on all of the beams using allocated reference signal resource regions.

In FIG. 7, it is assumed that the resource regions for beam switching is one OFDM symbol.

In reference to FIG. 7, if the terminal does not support beam switching in resource regions, it cannot perform measurement on all of the reference signals being transmitted in resource regions 1 to 6 (711 to 716). In this case, the terminal has to select resource regions for performing reference signal measurement therein.

If the terminal determines that beam switching is impossible, it may perform measurement on the reference signal transmitted in some of the resource regions of the first measurement period 710. For example, the terminal may perform measurement on the reference signals being transmitted at symbols 1, 3, and 5 (711, 713, and 715) to evaluate and determine the corresponding beam qualities.

When the reference signal is periodically transmitted in time resources, the terminal may perform reference signal measurement in some of resource regions of the second measurement period 720 in which reference signal measurement has not been performed in the previous measurement period. For example, the terminal may perform reference signal measurement at symbols 2, 4, and 6 (722, 724, and 726), but not at symbols 1, 3, and 5 in which the reference signal measurement has been performed in the previous measurement period to evaluate beam and determine beam qualities. In the disclosure, a CSI, an RSRP, and an RSRQ that are generated based on the result of the reference signal measurement may be collectively referred to as a measurement result, and the terminal may determine beam qualities between the base station and the terminal based on the measurement result. The terminal may select a beam with the best quality based on the measurement result and transmit/receive data using the selected beam. Here, the terminal may select a beam based on only the result of the measurement performed in the first measurement period 710 and transmit/receive data using the selected beam. The terminal may also select a beam based on the results of the measurements performed in both the first and second measurement periods. It may also be possible to select a beam based on the results of the measurements performed within a predetermined window along with the results of the measurements performed in the respective measurement periods.

Although the first and second measurement periods 710 and 720 are consecutive in the drawing, the first and second measurement periods 710 and 720 may be measurement periods separated by a predetermined interval. The interval between the measurement periods may be indicated by configuration information being transmitted from the base station to the terminal.

It may also be possible to implement a method for measuring a reference signal over three or more measurement periods according to the beam switching capability of the terminal.

By allowing beam sweeping to be performed in a few measurement periods as above, a terminal may receive the reference signal through a beam sweeping operation adaptive to its beam switching capability. Although the above description is directed to the case where one OFDM symbol is required for beam switching, however, the amount of resources required for the switching can be varied, and frequency and code resources can also be considered as resources. The technique described in the above embodiment may be identically applied to a base station. That is, the base station may perform beam sweeping in several measurement periods to perform reference signal measurement through a beam sweeping operation adaptive to its beam switching capability.

Second Embodiment

Figure 8:
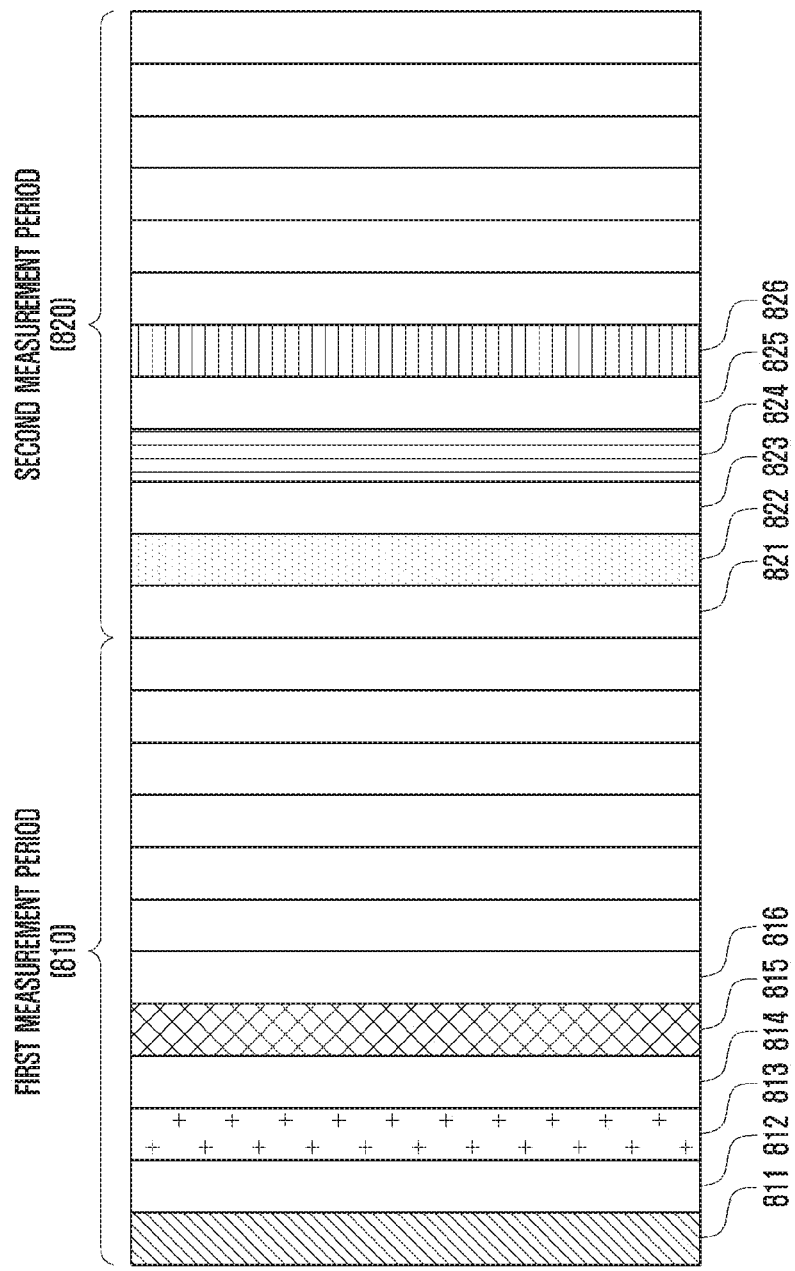
FIG. 8 is a diagram for explaining an operation of a transmitter according to the second embodiment of the disclosure.

FIG. 8 is a diagram for explaining an operation of a transmitter according to the second embodiment of the disclosure.

The transmitter of the disclosure may be a terminal or a base station. Although the description is directed to a case where the transmitter is a base station by way of example, the disclosure may be identically applied to a terminal.

The second embodiment may be applicable in a situation where a transmitter has no information on whether the receiver has the beam switching capability or a situation where terminals supporting beam switching and terminals not supporting beam switching are allocated the same resources. The second embodiment is directed to a method for the transmitter to allocate resources on which a terminal can perform reference signal measurement to the corresponding resources among all reference signal resource regions.

It is assumed that the terminal is allocated resources for receiving reference signals through beam sweeping as shown in part (a) of FIG. 5. However, the terminal may not support beam switching between the allocated resource regions.

The terminal may transmit beam switching capability information to the base station to notify the base station of its beam switching capability. In detail, the base station may request to the terminal for terminal capability information, and the terminal may transmit terminal capability information including the beam switching capability information to the base station in response to the request. The beam switching capability information being transmitted from the terminal to the base station may include information on the time required for beam switching. The terminal may also transmit information indicating predetermined resource region size-specific beam switching capabilities to the base station. In this case, the beam switching capability information may be configured with 1 bit.

It may be possible that there are predetermined beam switching capability levels classified according to required beam switching time, and the terminal may notify the base station of the beam switching capability level determined according to its required beam switching time. For example, the beam switching capability may be designated as high for a required beam switching time equal to or shorter than 400 ns, medium for a required beam switching time between 400 ns and 1.2 us, and low for a required beam switching time equal to or longer than 1 us; if the required beam switching time of the terminal is 300 ns, the terminal transmits the beam switching capability information set to "high" to the base station.

The terminal may transmit UE capability information including the above information to the base station via a higher layer signaling message or a radio resource control (RRC) message. The above description is just an example, and the beam switching capability information may be determined in various manners.

If all terminals do not support beam switching between resource regions, the base station may allocate resources for use by the terminals in receiving reference signals as shown in part (b) of FIG. 5.

However, if a terminal supports beam switching between resource regions, it is possible to allocate consecutive resource regions as shown in part (a) of FIG. 5, which makes it possible to utilize resources such as the time required for beam sweeping efficiently. In the case of allocating the consecutive resource regions as shown in part (a) of FIG. 5, some of the terminals may not perform reference signal measurements. There is therefore a need of a method for performing reference signal measurement on all of the beams using allocated reference signal resource regions.

Like in FIG. 7, it is assumed in FIG. 8 that the resource regions between which the corresponding terminal performs beam switching are OFDM symbols.

In reference to FIG. 8, if the terminal does not support beam switching in resource regions, it cannot perform measurement on all of the reference signals being transmitted in resource regions 1 to 6 (811 to 816). In this case, the base station may allocate resource regions 811, 813, 815, 822, 824, and 826, which are selected among the resource regions allocated as shown in part (a) of FIG. 5.

In detail, the base station may configure the terminal to perform measurement on the reference signals being transmitted in some of resource regions of the first measurement period 810. For example, the base station may configure the terminal to perform reference signal measurement at symbols 1, 3, and 5 (811, 813, and 815).

The base station may also configure the terminal to perform reference signal measurement in some of the resource regions of the second measurement period 820 in which reference signal measurement has not been performed in the previous measurement period. For example, the base station may configure the terminal to perform reference signal measurement at symbols 2, 4, and 6 (822, 824, and 826).

The base station may transmit reference signal configuration information to the terminal, and the configuration information may include information on resource regions in which the terminal has to perform measurement. In detail, if it is determined that the corresponding terminal cannot perform beam switching between the resource regions based on the beam switching capability of the terminal, the base station may configure the terminal to perform reference signal measurement in some of the multiple resource regions. The base station may also configure the terminal to perform reference signal measurement in the other resource regions in the next measurement period.

Accordingly, even when the base station transmits a reference signal over different beams mapped to consecutive resource regions as shown in part (a) of FIG. 5, the terminal may perform reference signal measurement to evaluate and determined beam qualities under the assumption that the reference signal is transmitted in alternate regions as shown in FIG. 8.

Like in the first embodiment, by allowing beam sweeping to be performed in a few measurement periods in the second embodiment, a terminal may receive the reference signal through a beam sweeping operation adaptive to its beam switching capability. Although the first and second measurement periods 710 and 720 are consecutive in the drawing, the first and second measurement periods 710 and 720 may be measurement periods separated by a predetermined interval.

It may also be possible to implement a method for measuring a reference signal over three or more measurement periods according to the beam switching capability of the terminal.

Although the above description is directed to the case where the beam switching is performed by the OFDM symbol, the resource amount for beam switching may vary, and frequency and code resources can also be considered as beam switching resources.

Although the first and second embodiments are directed to the situation where the transmitter and the receiver are a base station and a terminal respectively, the disclosure includes other embodiments in which the transmitter and the receiver are a terminal and a base station. It may also be possible that both the transmitter and receiver are terminals in sidelink communication.

Figure 9:
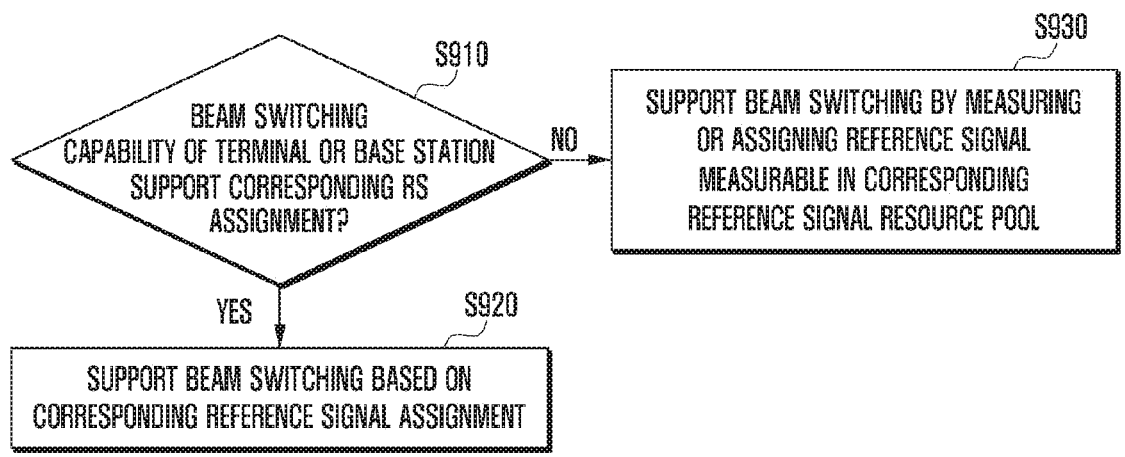
FIG. 9 is a flowchart illustrating an operation of a terminal or a base station according to an embodiment of the disclosure.

FIG. 9 is a flowchart illustrating an operation of a terminal or a base station according to an embodiment of the disclosure.

In reference to FIG. 9, the terminal or base station may determine at step S910 whether the terminal or the base station is capable of performing beam switching between resource regions allocated for transmitting a reference signal. That is, the terminal or base station determines whether its beam switching capability supports the resource allocation for the reference signal transmission in the whole reference signal resource pool in use for beam sweeping. Such a supportability determination may be made based on an OFDM symbol structure with a CP length, a subcarrier spacing, a beam switching time supported by a phase shifter of the terminal or base station, a supportable unit of precoding, etc.

If it is possible to perform beam switching between two resource regions allocated for the reference signal, the terminal or base station may transmit the reference signal in the respective reference signal resource regions via beam sweeping at step S920. That is, if the terminal or base station supports the corresponding reference signal resource pool, it may perform beam sweeping in the reference signal resource pool.

If it is impossible to perform beam switching between the allocated resources regions for transmitting the reference signal, the terminal or base station may perform, at step S930, reference signal measurement in some of the reference signal resource regions or transmit configuration information instructing reference signal measurement to be performed in some of the reference signal resource regions. That is, if the terminal or base station does not support the resource allocation for the reference signal transmission in the reference signal resource pool, it may perform the reference signal measurement in the resource regions or allocate reference signal resource regions covered by the corresponding beam switching capability in the whole reference signal resource pool for supporting the beam sweeping operation.

In detail, the terminal or base station may perform reference signal measurement in some of the reference signal resource regions covered by its beam switching capability among the allocated reference signal resource regions. The terminal or base station may also perform reference signal measurement in the remaining reference signal resource regions in the next measurement period.

Meanwhile, the terminal or base station may be configured to perform reference signal measurement in some of the resource regions allocated for reference signal transmission. The terminal or base station may be configured to perform reference signal measurement in the remaining reference signal resource regions in the next measurement period.

Figure 10:
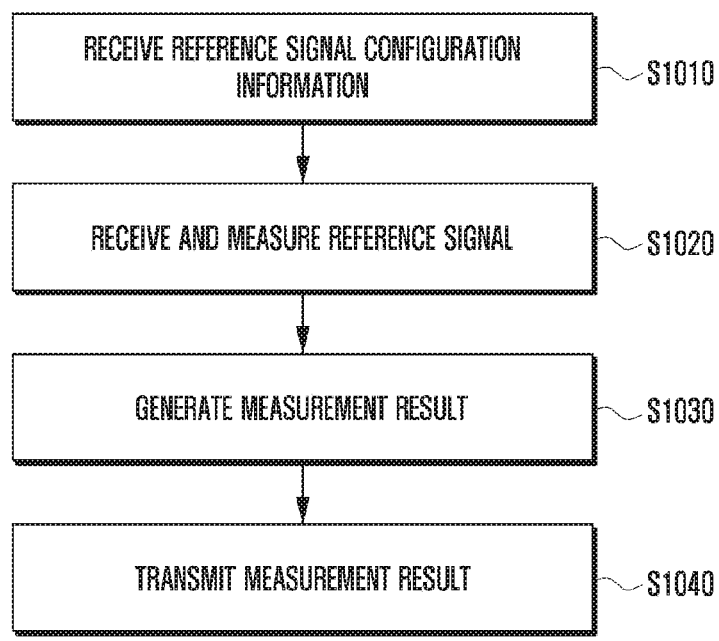
FIG. 10 is a flowchart illustrating an operation of a terminal according to an embodiment of the disclosure.

FIG. 10 is a flowchart illustrating an operation of a terminal according to an embodiment of the disclosure.

In reference to FIG. 10, the terminal may receive reference signal configuration information at step S1010. The terminal may receive the configuration information via an RRC message. In detail, the terminal may receive the configuration information including information on configuration of reference signals (CSI-RS, Mobility RS, Synchronization signal, beam RS, etc.) for beam sweeping. The terminal may ascertain numbers of port-specific reference signals, N1 and N2 indicating numbers of dimension-specific antennas and O1 and O2 indicating dimension-specific oversampling factors, from the received configuration information.

The configuration information may include at least one of information on a periodicity and an offset of measurement period for reference signal transmission or information on the resource regions allocated for the reference signal in the measurement period.

In the case where the measurement period is determined on the time axis, a measurement period may be equivalent to a subframe, and a resource region may be equivalent to a symbol. However, a length of the symbol and a length of the subframe may vary according to the subcarrier spacing. In this case, the configuration information may include a subframe configuration information (subframe config) for transmitting multiple reference signals and multiple configuration information (resource config) for configuring locations. However, the measurement period may be determined on the frequency axis.

The configuration information may include at least one of codebook subset restriction-related information, report-related information, a CSI-process index, or transmit power information.

The report information may denote feedback configuration information based on at least one reference signal location. The corresponding information may include a PMI/CQI periodicity and offset, an RI periodicity and offset, wideband/subband indication, and a submode.

Next, the terminal may receive a reference signal at step 1020. The terminal may receive the reference signal based on the reference signal configuration information. The terminal may also estimate channels between the antennas of the base station antennas and terminal based on the reference signal.

The terminal may perform the operation described with reference to FIG. 9 in the channel estimation procedure.

That is, the terminal may determine whether it can perform beam switching between the resource regions allocated for the reference signal based on its beam switching capability.

If the terminal can perform beam switching between the reference signal resource regions (i.e., if the terminal can receive the reference signal via beam sweeping), it may perform reference signal measurement.

If the terminal cannot perform beam switching, it may perform reference signal measurement in some of the reference signal resource regions. That is, the terminal may receive the reference signal in some of the resource regions for performing measurement thereon. Here, the terminal may perform reference signal measurement in the resource regions separated by a predetermined interval. The terminal may also perform reference signal measurement in the remaining reference signal resource regions in the next measurement period.

Next, the terminal may generate a measurement result at step S1030. In detail, the terminal may generate feedback information (rank, PMI, CQI, RSRP, RSRQ, etc.) based on the estimated channel or received signal quality according to the feedback configuration information; the term "feedback information" may be replaced by the term "measurement result".

Next, the terminal may transmit the measurement result to the base station at step S1040. The terminal transmits the feedback information at predetermined feedback timings according to the feedback configuration provided by the base station and completes the feedback generation and report procedure.

Figure 11:
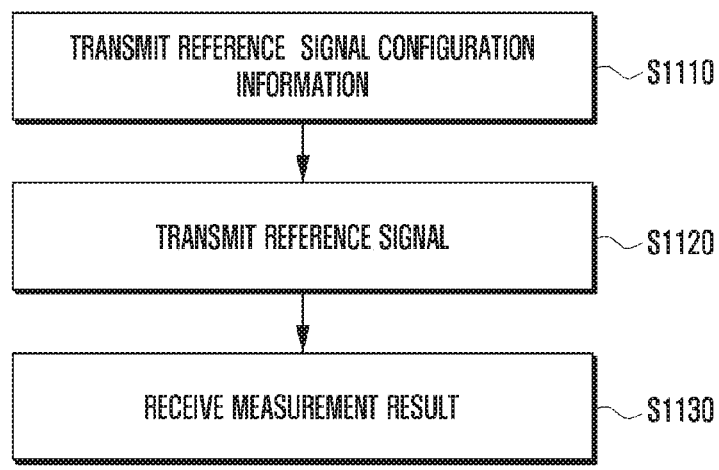
FIG. 11 is a flowchart illustrating an operation of a base station according to an embodiment of the disclosure.

FIG. 11 is a flowchart illustrating an operation of a base station according to an embodiment of the disclosure.

In reference to FIG. 11, the base station may transmit reference signal configuration information at step S1110. The base station may transmit the configuration information to a terminal via an RRC message. In detail, the base station may transmit the configuration information on reference signals (CSI-RS, mobility RS, Synchronization signal, beam RS, etc.) for beam sweeping to the terminal. The configuration information may include numbers of reference signal-specific ports, N1 and N2 indicating numbers of dimension-specific antennas and O1 and O2 indicating dimension-specific oversampling factors.

The configuration information may include at least one of information on a periodicity and an offset of a measurement period for reference signal transmission or information on the resource regions allocated for the reference signal in the measurement period.

In the case where the measurement period is determined on the time axis, a measurement period may be equivalent to a subframe, and a resource region may be equivalent to a symbol. However, a length of the symbol and a length of the subframe may vary according to the subcarrier spacing. In this case, the configuration information may include a subframe configuration information (subframe config) for transmitting multiple reference signals and multiple configuration information (resource config) for configuring locations.

However, if the terminal cannot perform beam switching between the resource regions, the configuration information may include information on some resource regions for the terminal to perform reference signal measurement among the resource regions allocated for reference signal transmission. For example, the configuration information may include the information on the resource regions separated by a predetermined interval in which the terminal has to perform reference signal measurement among the consecutive reference signal resource regions.

The base station may be configured to transmit the reference signal in some resource regions among the consecutive resource regions and, in this case, the configuration signal may include information on the resource regions in which the reference signal is transmitted. A detailed description thereof is made later.

The configuration information may include at least one of codebook subset restriction-related information, CSI report-related information, a CSI-process index, or transmit power information.

The base station may perform the operation described with reference to FIG. 9 in the reference signal information configuration procedure.

That is, the base station may receive information on the beam switching capability of the terminal. The terminal's beam switching capability information reception procedure of the base station is performed in a similar way as described above; thus, a detailed description thereof is omitted herein.

The base station may determine whether the terminal is capable of performing beam switching in resource regions based on the terminal's beam switching capability.

If it is determined that the terminal is capable of performing beam switching in resource regions, the base station may transmit the corresponding reference signal configuration information.

If it is determined that the terminal is incapable of performing beam switching in signal resource regions, the base station may configure the terminal to receive the reference signal in some of the consecutive resource regions. The base station may configure the terminal to receive the reference signal in the resource regions separated by a predetermined interval, e.g., in the resource regions 1, 3, and 6. The base station may also configure the terminal to receive the reference signal in the remaining resource regions in the next measurement period.

The CSI report-related information may denote feedback configuration information based on a least one reference signal. The corresponding information may include an MI/CQI periodicity and offset, an RI periodicity and offset, wideband/subband indication, and a submode.

Next, the base station may transmit the reference signal at step S1120.

The terminal may estimate per-antenna port channels, generate a corresponding measurement result (such as PMI, RI, CQI, RSRP, and RSRQ) based on the estimation result, and transmit the measurement result to the base station.

In the case where the terminal does not support beam switching in resource regions, the terminal may receive the reference signal in the resource region configured according to the configuration information to generate the measurement result.

The base station may receive the measurement result from the terminal at step S1130. The base station may receive the feedback information from the terminal at a predetermined timing and determine a channel state between the terminal and the base station based on the feedback information.

Figure 12:
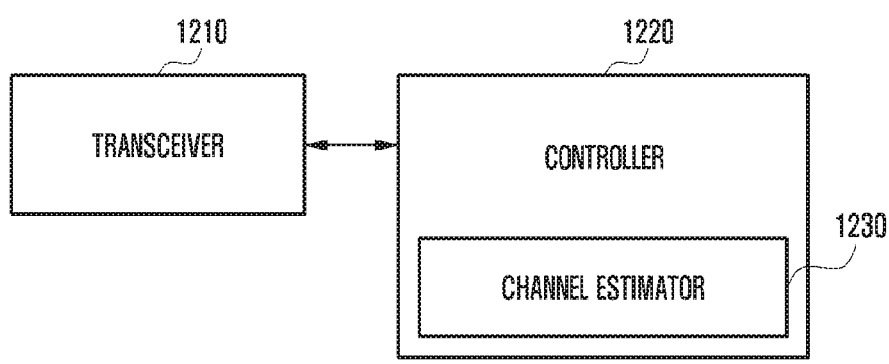
FIG. 12 is a block diagram illustrating a configuration of a terminal according to an embodiment of the disclosure.

FIG. 12 is a block diagram illustrating a configuration of a terminal according to an embodiment of the disclosure.

In reference to FIG. 12, the terminal includes a communication circuitry 1210 and a controller 1220.

The communication circuitry 1210 may transmit or receive data to and from outside (e.g., base station). Here, the communication circuitry 1210 may transmit feedback information to the base station under the control of the controller 1220.

The controller 1220 may control states and operations of all of the components constituting the terminal. In detail, the controller 1220 may generate the feedback information according to configuration information received from the base station. The controller 1220 may also control the communication circuitry 1210 to transmit the feedback information to the base station according to the time information received from the base station. In order to accomplish this, the controller 1220 may include a channel estimator 1230.

The channel estimator 1230 may make a determination on the feedback information to be transmitted based on the reference signal and feedback allocation information received from the base station and estimate channels based on the reference signals received based on the feedback information. The channel estimator 1230 may also decode PDSCH based on the size and rank of PRG assigned for PDSCH transmission and pre-coded reference signal mapping to DMRS ports that are indicated in DCI transmitted by the base station as described in an embodiment of the disclosure. Although FIG. 12 depicts the terminal composed of the communication circuitry 1210 and the controller 1220, the configuration of the terminal is not limited thereto and may further include various components required for implementing functions being executed in the terminal. For example, the terminal may further include a display for displaying an operation state of the terminal, an input unit for receiving a signal input by a user for executing a function, and a storage unit for storing data generated in the terminal. Although it is depicted that the channel estimator 1230 is included in the controller 1220, the configuration of the terminal is not limited thereto. The controller 1220 may control the communication circuitry 1210 to receive configuration information on at least one reference signal resource from the base station. The controller 1220 may control the communication circuitry 1210 to receive feedback configuration information on the basis of which the terminal measures at least one reference signal and generates feedback information.

The controller 1220 may measure at least one reference signal received by the communication circuitry 1210 and generate the feedback information according to the feedback configuration information. The controller 1220 may control the communication circuitry 1210 to transmit the generated feedback information to the base station at a feedback timing determined according to the feedback configuration information. The controller 1220 may also receive a reference signal (CSI-RS, Mobility RS, Synchronization signal, etc.) from the base station, generate feedback information based on the received reference signal, and transmit the generated feedback information to the base station. Here, the controller 1220 may select a precoding matrix, a beam index, an antenna port, a resource index, etc. according to the information received from the base station.

In detail, the controller 1220 of the terminal of the disclosure may receive reference signal configuration information. The information elements included in the configuration information have been described above and thus detailed descriptions thereof are omitted herein.

The controller 1220 may receive a reference signal. Here, the controller 1220 may determine whether beam switching is possible in resource regions allocated for transmitting the reference signal based on the beam switching capability of the terminal.

If beam switching is possible, i.e., if it is possible to receive the reference signal on the allocated resources via beam sweeping, the controller 1220 may perform measurement on the reference signal.

If beam switching is impossible, the controller 1220 may perform reference signal measurement in some of the allocated resources. That is, the controller 1220 may perform reference signal measurement in some of resource regions. The controller 1220 may perform reference signal measurement in resource regions separated. The controller 1220 may also perform reference signal measurement in remaining resource regions in subsequent measurement periods.

The controller 1220 may generate a measurement result. In detail, the controller 1220 may generate feedback information (rank, PMI, CQI, RSRP, RSRQ, etc.) based on the estimated channel and receive signal quality according to the feedback configuration information; the term "feedback information" may be replaced by the term "measurement result".

Next, the controller 1220 may transmit the measurement result to the base station. The terminal may transmit to the base station the feedback information at a feedback timing determined according to the feedback configuration from the base station. Furthermore, the controller 1220 may control the operations of the terminal of the disclosure.

Figure 13:
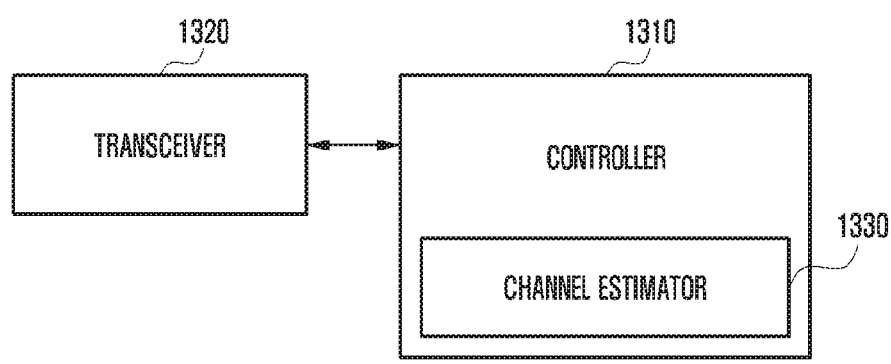
FIG. 13 is a block diagram illustrating a configuration of a base station according to an embodiment of the disclosure.

FIG. 13 is a block diagram illustrating a configuration of a base station according to an embodiment of the disclosure.

In reference to FIG. 13, the base station includes a controller 1310 and a communication circuitry 1320.

The controller 1310 may control states and operations of all of the components constituting the base station. In detail, the controller 1310 may allocate resources for transmitting reference signals (CSI-RS, Mobility RS, Synchronization signal, etc.) for use by a terminal in channel estimation and feedback resources including feedback timings to the terminal. In order to accomplish this, the controller 1310 may include a resource allocator 1330. The controller 1310 may make a feedback configuration with feedback timings so as to avoid collision between feedback from multiple terminals and receive and interpret feedback information at the corresponding timings.

The transceiver 1320 may transmit and receive data, reference signals, and feedback information to and from a terminal. The transceiver 1320 may transmit a reference signal to the terminal on the resources allocated and receive feedback including channel information from the terminal under the control of the controller 1310. Although it is depicted that the resource allocator 1330 is included in the controller 1310, the configuration of the base station is not limited thereto.

The controller 1310 may control the transceiver 1320 to transmit configuration information on at least one reference signal or generate the at least one reference signal. The controller 1310 may also control the transceiver 1320 to transmit feedback configuration information for use in generating feedback information based on the measurement result. The controller 1310 may also control the transceiver 1320 to transmit the at least one reference signal to the terminal and receive the feedback information transmitted by the terminal at the feedback timings determined based on the feedback configuration information. The controller 1310 may transmit the feedback configuration information and reference signal to the terminal and receive the feedback information generated based on the feedback configuration information and the reference signal information from the terminal. Here, the controller 1310 may transmit feedback configuration information per antenna port group and additional feedback information generated based on the relationship among antenna groups. The controller 1310 may transmit CSI-RS beamformed based on the feedback information to the terminal and receive feedback information generated based on the reference signal from the terminal.

In detail, the controller 1310 may transmit reference signal configuration information to the terminal. The information elements included in the configuration information have been described above and thus detailed descriptions thereof are omitted herein.

The controller 1310 may receive beam switching capability information of the terminal. The controller 1310 receives the beam switching capability information in a similar way to that described above and thus a detailed description of the beam switching capability reception process is omitted hereinafter.

The controller 1310 may determine whether beam switching is possible in resource regions allocated for transmitting the reference signal based on the beam switching capability of the terminal.

If beam switching is possible, the controller 1310 may map the reference signal to the consecutive resource regions and transmit the corresponding reference signal configuration information.

If beam switching is impossible, the controller 1310 may configure the terminal to receive the reference signal in some of the consecutive resource regions. The base station may configure the terminal to receive the reference signal in the resource regions separated by a predetermined interval, e.g., in resource regions 1, 3, and 5. The controller 1310 may also configure the terminal to receive the reference signal in the remaining resource regions in the next measurement period.

The CSI report-related information may denote feedback configuration information based on a least one reference signal. The corresponding information may include a MI/CQI periodicity and offset, an RI periodicity and offset, wideband/subband indication, and a submode.

The controller 1310 may transmit the reference signal to the terminal.

The terminal may estimate per-antenna port channels, generate a corresponding measurement result (such as PMI, RI, CQI, RSRP, and RSRQ) based on the estimation result, and transmit the measurement result to the base station.

In the case where the terminal does not support beam switching in resource regions, the terminal may receive the reference signal in the resource region configured according to the configuration information to generate the measurement result.

The controller 1310 may receive the measurement result from the terminal. The controller 1310 may receive the feedback information from the terminal at a predetermined timing and determine a channel state between the terminal and the base station based on the feedback information.

Although preferred embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

What is claimed is:

1. A method performed by terminal in a wireless communication system, the method comprising:
receiving, from a base station, configuration information on a reference signal;
determining whether the terminal is capable of beam switching within resource regions, the resource regions used for transmitting the reference signal; and
measuring, in case that the terminal is not capable of the beam switching within the resource regions, the reference signal for a first subset of the resource regions and the reference signal for a second subset of the resource regions, based on the configuration information,
wherein the first subset is included in a first measurement period and the second subset is included in a second measurement period which is next to the first measurement period.

2. The method of claim 1, wherein receiving the configuration information comprises
receiving, from the base station, report configuration information, and
measuring the reference signal comprises reporting measurement information on the reference signal according to the report configuration information.

3. The method of claim 1, wherein the configuration information comprises at least one of periodicity information of the measurement period for transmitting the reference signals, offset information, or information on the resource regions in which the reference signal is transmitted within the measurement period.

4. A method performed by a base station in a wireless communication system, the method comprising:
receiving, from a terminal, beam switching capability information of the terminal;
determining whether the terminal is capable of beam switching within resource regions, used for transmitting a reference signal based on the beam switching capability information; and
transmitting, to the terminal, configuration information on the reference signal based on a result of the determination, wherein, in case that the terminal is not capable of the beam switching within the resource regions, the configuration information instructs the terminal to measure the reference signal for a first subset of the resource regions and the reference signal for a second subset of the resource regions, and wherein the first subset is included in a first measurement period and the second subset is included in a second measurement period which is next to the first measurement period.

5. The method of claim 4, wherein transmitting, to the terminal, the configuration information comprises transmitting, to the terminal, report configuration information for receiving a measurement result on the reference signal and receiving the measurement result according to the report configuration information.

6. The method of claim 4, wherein the configuration information includes at least one of periodicity information of a measurement period for transmitting the reference signal, offset information, or information on the resource regions for the terminal to perform a measurement within the measurement period.

7. A terminal in a wireless communication system, comprising:

a transceiver; and a controller configured to:

receive, via the transceiver from a base station, configuration information on a reference signal, determine whether the terminal is capable of beam switching within resource regions, the resource regions used for transmitting the reference signal, and measure, in case that the terminal is not capable of the beam switching within the resource regions, the reference signal for a first subset of the resource regions and the reference signal for a second subset of the resource regions, based on the configuration information, wherein the first subset is included in a first measurement period and the second subset is included in a second measurement period which is next to the first measurement period.

8. The terminal of claim 7, wherein the controller is configured to receive, via the transceiver from the base station, report configuration information and report measurement information on the reference signal according to the report configuration information.

9. The terminal of claim 7, wherein the configuration information comprises at least one of periodicity information of a measurement period for transmitting the reference signal, offset information, or information on the resource regions in which the reference signal is transmitted within the measurement period.

10. A base station in a wireless communication system, comprising:

a transceiver; and a controller configured to:

receive, via the transceiver from a terminal, beam switching capability information of the terminal, determine whether the terminal is capable of beam switching within resource regions, used for transmitting a reference signal, based on the beam switching capability information, and transmit, via the transceiver to the terminal, configuration information on the reference signal based on a result of the determination, wherein, in case that the terminal is not capable of the beam switching within the resource regions, the configuration information instructs the terminal to measure the reference signal for a first subset of the resource regions and the reference signal for a second subset of the resource regions, and wherein the first subset is included in a first measurement period and the second subset is included in a second measurement period which is next to the first measurement period.

11. The base station of claim 10, wherein the controller is configured to control to transmit, via the transceiver to the terminal, report configuration information for receiving a measurement result on the reference signal, and receive, via the transceiver from the terminal, the measurement result according to the report configuration information, and the configuration information comprises at least one of periodicity information of a measurement period for transmitting the reference signal, offset information, or information on the resource regions for the terminal to perform a measurement within the measurement period.

* * * * *